United States Patent
Davis et al.

(10) Patent No.: US 11,993,388 B2
(45) Date of Patent: May 28, 2024

(54) CORRUGATED STIFFENING DEVICES UTILIZING PEAKS AND VALLEYS AND METHODS OF MANUFACTURE

(71) Applicant: ROHR, INC., Chula Vista, CA (US)

(72) Inventors: Jennifer Davis, La Jolla, CA (US); Nathaniel M. Gray, Stratham, NH (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/465,027

(22) Filed: Sep. 2, 2021

(65) Prior Publication Data
US 2023/0066332 A1    Mar. 2, 2023

(51) Int. Cl.
*B29C 70/34* (2006.01)
*B29C 65/00* (2006.01)
*B29C 65/02* (2006.01)
*B29C 70/44* (2006.01)
*B32B 37/00* (2006.01)
*B64D 29/08* (2006.01)
*B29K 101/12* (2006.01)
*B29L 31/00* (2006.01)

(52) U.S. Cl.
CPC .............. *B64D 29/08* (2013.01); *B29C 65/02* (2013.01); *B29C 66/0342* (2013.01); *B29C 70/345* (2013.01); *B32B 37/00* (2013.01); *B29K 2101/12* (2013.01); *B29L 2031/7504* (2013.01); *B32B 2250/02* (2013.01); *B32B 2250/242* (2013.01)

(58) Field of Classification Search
CPC ..... B29C 70/462; B29C 70/345; B29C 65/04; B29C 65/028
See application file for complete search history.

(56) References Cited

U.S. PATENT DOCUMENTS

| 3,507,355 A | 4/1970 | Lawson |
| 3,658,612 A | 4/1972 | Corzine |
| 5,399,215 A * | 3/1995 | Blot ........................ B21D 39/03 264/545 |

(Continued)

FOREIGN PATENT DOCUMENTS

| DE | 102011076082 | 11/2012 |
| EP | 2833356 | 2/2015 |

(Continued)

OTHER PUBLICATIONS

Chen, L., et al., Compressive response of multi-layered thermoplastic composite corrugated sandwich panels: Modelling and experiments, Composites Part B 189 (2020), 8 pages. (Year: 2020).*

(Continued)

*Primary Examiner* — Matthew J Daniels
(74) *Attorney, Agent, or Firm* — SNELL & WILMER L.L.P.

(57) ABSTRACT

A method may comprise: laying up a first plurality of plies of material comprising thermoplastic resin and fiber to form an inner skin preform, the inner skin preform being a continuous sheet including alternating peaks and valleys; laying up a second plurality of plies of material comprising thermoplastic resin and fiber to form an outer skin preform; and joining the inner skin preform to the outer skin preform.

20 Claims, 4 Drawing Sheets

(56) References Cited

U.S. PATENT DOCUMENTS

| | | | |
|---|---|---|---|
| 5,462,408 A | 10/1995 | Coffy | |
| 6,632,502 B1 | 10/2003 | Allen et al. | |
| 6,713,008 B1 | 3/2004 | Teeter | |
| 8,245,971 B2 | 8/2012 | Maketa et al. | |
| 8,292,227 B2 | 10/2012 | Stuhr et al. | |
| 8,377,247 B2 | 2/2013 | Guzman et al. | |
| 9,023,265 B1* | 5/2015 | Rotter | B29C 70/30 264/258 |
| 9,358,764 B2 | 6/2016 | Prebil et al. | |
| 9,610,756 B2 | 4/2017 | Ashton et al. | |
| 9,761,216 B2 | 9/2017 | Nampy et al. | |
| 9,764,818 B2 | 9/2017 | Nampy et al. | |
| 9,783,289 B2 | 10/2017 | Lee et al. | |
| 10,232,926 B2 | 3/2019 | Goehlich | |
| 10,556,670 B2 | 2/2020 | Koppelman et al. | |
| 10,695,986 B2 | 6/2020 | Gurney et al. | |
| 10,933,595 B2 | 3/2021 | Matsumoto et al. | |
| 11,242,822 B2 | 2/2022 | Gurvich et al. | |
| 11,572,850 B2 | 2/2023 | Kelford et al. | |
| 11,703,031 B2 | 7/2023 | Adrian Schmidt | |
| 11,732,674 B2 | 8/2023 | Glemarec et al. | |
| 2003/0089824 A1 | 5/2003 | Sternberger | |
| 2006/0141260 A1 | 6/2006 | Haque et al. | |
| 2010/0163167 A1 | 7/2010 | Maheshwari et al. | |
| 2011/0135862 A1 | 6/2011 | Sumi | |
| 2013/0266772 A1 | 10/2013 | Fujii | |
| 2013/0302544 A1* | 11/2013 | Benthien | B29C 70/446 428/34.1 |
| 2013/0316147 A1* | 11/2013 | Douglas | B64C 3/182 156/60 |
| 2014/0099477 A1* | 4/2014 | Matsen | B29C 70/543 156/60 |
| 2014/0186586 A1* | 7/2014 | Victorazzo | B29D 99/001 428/167 |
| 2016/0257396 A1 | 9/2016 | Cawthorne et al. | |
| 2017/0355152 A1* | 12/2017 | Joern | B29C 65/02 |
| 2018/0229829 A1 | 8/2018 | Pierick et al. | |
| 2019/0153993 A1 | 5/2019 | Tobin et al. | |
| 2019/0283856 A1 | 9/2019 | Clapp et al. | |
| 2020/0010175 A1 | 1/2020 | Sanz Martinez et al. | |
| 2020/0307756 A1 | 10/2020 | Periyasamy et al. | |
| 2020/0095955 A1 | 11/2020 | Davis | |
| 2020/0353667 A1 | 11/2020 | Davis | |
| 2021/0039349 A1 | 2/2021 | Gurvich et al. | |

FOREIGN PATENT DOCUMENTS

| | | |
|---|---|---|
| EP | 3643471 | 4/2020 |
| EP | 3858584 | 8/2021 |
| FR | 2559422 | 2/1985 |

OTHER PUBLICATIONS

USPTO; Restriction/Election Requirement dated Aug. 24, 2022 in U.S. Appl. No. 17/464,997.

Hu, J. et al., Novel panel-core connection process and impact behaviors of CF/PEEK thermoplastic composite sandwich structures with truss cores, Composite Structures, vol. 251 (2020), 16 pages. (Year: 2020).

USPTO; Non-Final Office Action dated Sep. 21, 2022 in U.S. Appl. No. 17/464,997.

USPTO; Final Office Action dated Jan. 18, 2023 in U.S. Appl. No. 17/464,997.

USPTO; Advisory Action dated Mar. 30, 2023 in U.S. Appl. No. 17/464,997.

European Patent Office, European Search Report dated Jan. 20, 2023 in Application No. 22193485.4.

European Patent Office, European Search Report dated Jan. 30, 2023 in Application No. 22193787.3.

European Patent Office, European Search Report dated Jan. 26, 2023 in Application No. 22193452.4.

USPTO; Notice of Allowance dated May 10, 2023 in U.S. Appl. No. 17/464,997.

USPTO; Non-Final Office action dated Aug. 28, 2023 in U.S. Appl. No. 17/465,051.

* cited by examiner

CORRUGATED STIFFENING DEVICES UTILIZING PEAKS AND VALLEYS AND METHODS OF MANUFACTURE

FIELD

The present disclosure relates generally to thermoplastics manufacturing, and more specifically to forming fiber-reinforced thermoplastic materials having a monolithic stiffening structure.

BACKGROUND

Various industries include components having multi-dimensional panels for various uses. For example, the aerospace industry utilizes nacelles for various applications for providing a protective housing around adjacent components as well as for providing an aerodynamic surface for reducing drag, among other applications. For example, a fan cowl is used for covering various components of a turbine engine and provides an aerodynamic surface for the turbine engine and related systems. A fan cowl outer skin preform is typically made from metal or carbon fiber thermoset composites in a skin and stringer or core stiffened architecture. A current method of forming skins and/or stiffeners includes laying up thermoset composite plies by hand, one at a time, to form a laminate structure, representing a time consuming process.

SUMMARY

A method for forming a thermoplastic panel is disclosed herein. The method may comprise: laying up a first plurality of plies of material comprising thermoplastic resin and fiber to form an inner skin preform, the inner skin preform being a continuous sheet including alternating peaks and valleys; laying up a second plurality of plies of material comprising thermoplastic resin and fiber to form an outer skin preform; and bonding the inner skin preform to the outer skin preform.

In various embodiments, joining the inner skin preform to the outer skin preform includes heating the inner skin preform and the outer skin preform to a fusing temperature. The method may further comprise cooling the inner skin preform and the outer skin preform after consolidating the inner skin preform and the outer skin preform together via the joining. Joining the inner skin preform to the outer skin preform may form a stiffening structure that is monolithic with the thermoplastic panel. The first plurality of plies of material may be layed up in a hard female layup tool including a second set of alternating peaks and valleys, the second set of alternating peaks and valleys in accordance with the alternating peaks and valleys of the continuous sheet. The second plurality of plies of material may be layed up in a second layup tool having a second female mold corresponding to an outer surface of the thermoplastic panel. The inner skin preform and the outer skin preform may be assembled prior to bonding.

A method of manufacturing a thermoplastic panel is disclosed herein. The method may comprise: assembling an inner skin preform and an outer skin preform, the inner skin preform having a first contour including alternating peaks and valleys, the valleys of the inner skin preform in contact with an inner surface of the outer skin preform; heating the inner skin preform and the outer skin preform; and consolidating the inner skin preform and the outer skin preform to form the thermoplastic panel.

In various embodiments, the outer skin preform includes an outer surface having a second contour, the second contour being defined in a longitudinal direction. The inner skin preform may define a stiffening structure of the thermoplastic panel. The alternating peaks and valleys may be defined in a longitudinal direction. The inner skin preform may be continuous. A peak in the alternating peaks and valleys may extend circumferentially along the inner surface of the outer skin preform. The valleys in the alternating peaks and valleys may be joined to the inner surface of the outer skin preform in response to the heating. The inner skin preform and the outer skin preform may both comprise a plurality of plies of material comprising thermoplastic resin and fiber. The method may further comprise laying up a first plurality of plies to form the inner skin preform and laying up a second plurality of plies to form the outer skin preform prior to assembly.

A stiffened example of a fan cowl panel is disclosed herein. The stiffened panel may comprise: an outer surface defining an arcuate shape, the outer surface being contoured in a longitudinal direction; an inner surface disposed radially inward from the outer surface; and a stiffening structure including a plurality of peaks extending radially inward from the inner surface, each peak in the plurality of peaks including an apex spaced apart and defining a gap from the inner surface.

In various embodiments, the outer surface, the inner surface and the stiffening structure form a monolithic component. Each peak in the plurality of peaks may define a hollow channel in a circumferential direction. The stiffening structure of the stiffened panel of the fan cowl may be continuous.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
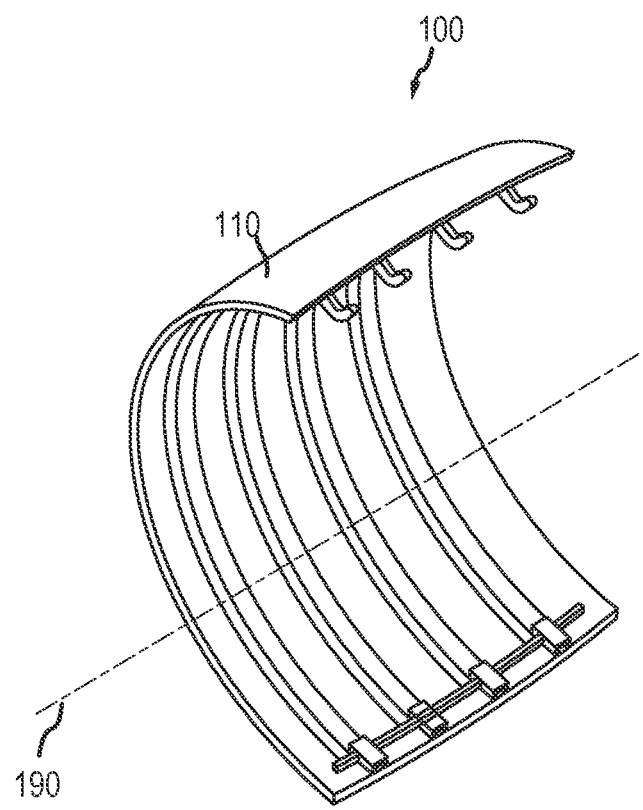
FIG. 1 illustrates a perspective view of a panel half, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

Throughout this specification, reference is made to "melting temperature" and "recrystallization temperature" in respect of thermoplastics. It is understood that the terms are defined as follows:

"Melting temperature" is the temperature range at which the plastic undergoes a phase change from a solid to liquid, upon heating.

"Recrystallization temperature" is the temperature at which the semi-crystalline or crystalline matrix begins to form crystals upon cooling from the molten amorphous state. The onset of recrystallization from the molten state takes place over a temperature "window-range", which is dependent on the rate of cooling and the final achievable degree of crystallinity of the polymer matrix.

Disclosed herein is a method for manufacturing a corrugated stiffened structure such as a fan cowl. The method may include laying up an inner skin preform on a first layup tool to form a stiffening structure for the fan cowl and laying up an outer skin preform on a second layup tool corresponding to a shape of the fan cowl. With the stiffening structure being fabricated as an inner skin preform, and the outer skin preform being fabricated from a similar process, the inner skin preform and the outer skin preform may be assembled and consolidated directly after fabrication, greatly reducing a production time and simplifying the manufacturing process. The method disclosed herein may eliminate, or greatly reduce, addition processes during manufacturing, tooling costs, and capital expenditures for fan cowl manufacturing, in accordance with various embodiments. Additionally, in various embodiments, the method disclosed herein may minimize a value chain and improve an overall structure of the fan cowl.

In various embodiments, changing a shape of the stiffening structure as disclosed herein may facilitate the manufacturing process disclosed herein. Typical stiffening structures of fan cowls would be unable to accommodate the process disclosed herein due to a tight radii of the stiffener shape.

With reference to FIG. 1, a perspective view of a stiffened panel outer skin 100 is illustrated, in accordance with various embodiments. Stiffened panel 100 may comprise an outer skin preform 110. Outer skin preform 110 may comprise a semi-cylindrical geometry when viewed from the aft direction. Outer skin preform 110 may define a centerline axis 190. Stated differently, outer skin preform 110 may be bent around centerline axis 190.

Outer skin preform 110 may be contoured along the longitudinal direction. Stated differently, outer skin preform 110 may comprise a non-linear geometry (e.g., rounded) along the longitudinal direction.

Outer skin preform 110 may be made from a fiber-reinforced thermoplastic material. In various embodiments, the outer skin preform 110 comprises a continuous reinforcing fiber and a thermoplastic resin. The reinforcing fiber to be used for the outer skin preform 110 has no particular limitations with respect to the type thereof, and examples thereof include metal fibers, such as an aluminum fiber, a brass fiber, and a stainless steel fiber, carbon fibers (including graphite fibers), such as polyacrylonitrile (PAN)-based carbon fibers, rayon-based carbon fibers, lignin-based carbon fibers, and pitch-based carbon fibers, insulating fibers, such as glass fiber, organic fibers, such as aramid fibers, polyparaphenylene benzoxazole (PBO) fibers, polyphenylene sulfide fibers, polyester fibers, acrylic fibers, nylon fibers, and polyethylene fibers, and inorganic fibers, such as silicon carbide fibers and silicon nitride fibers. Fibers prepared by applying surface treatment to these fibers are also available. Examples of the surface treatment include treatment with a coupling agent, treatment with a sizing agent, treatment with a binder, and adhesion treatment with an additive in addition to deposition treatment with conductive metal.

In the disclosure, the thermoplastic resin to be used for the outer skin preform 110 may be either crystalline or amorphous.

Examples of the crystalline thermoplastic resin include polyester, polyolefin, polyoxymethylene (POM), polyamide (PA), polyarylene sulfide, polyketone (PK), polyetherketone (PEK), polyether ether ketone (PEEK), polyether ketone ketone (PEKK), polyvinylidene fluoride (PVDF), polytetrafluoroethylene (PTFE), polyaryletherketone (PAEK), polyether nitrile (PEN), fluororesin, and liquid crystal polymer (LCP). Examples of the polyester include polyethylene terephthalate (PET), polybutylene terephthalate (PBT), polytrimethylene terphthalate (PTT), polyethylene naphthalate (PEN), and liquid crystal polyester. Examples of the polyolefin include polyethylene (PE), polypropylene (PP), and polybutylene. Examples of the polyarylene sulfide include polyphenylene sulfide (PPS). Examples of the fluororesin include polytetrafluoroethylene.

Examples of the amorphous thermoplastic resin include polystyrene, polycarbonate (PC), polymethyl methacrylate (PMMA), polyvinyl chloride (PVC), polyphenylene ether (PPE), polyimide (PI), polyamide imide (PAI), polyetherimide (PEI), polysulfone (PSU), polyether sulfone (PES), and polyarylate (PAR). The thermoplastic resin to be used for the outer skin preform 110 also may be phenoxy resin, polystyrene, polyolefin, polyurethane, polyester, polyamide, polybutadiene, polyisoprene, fluorine resin, acrylonitrile, and other thermoplastic elastomers, and copolymers and modified resin thereof.

Figure 2:
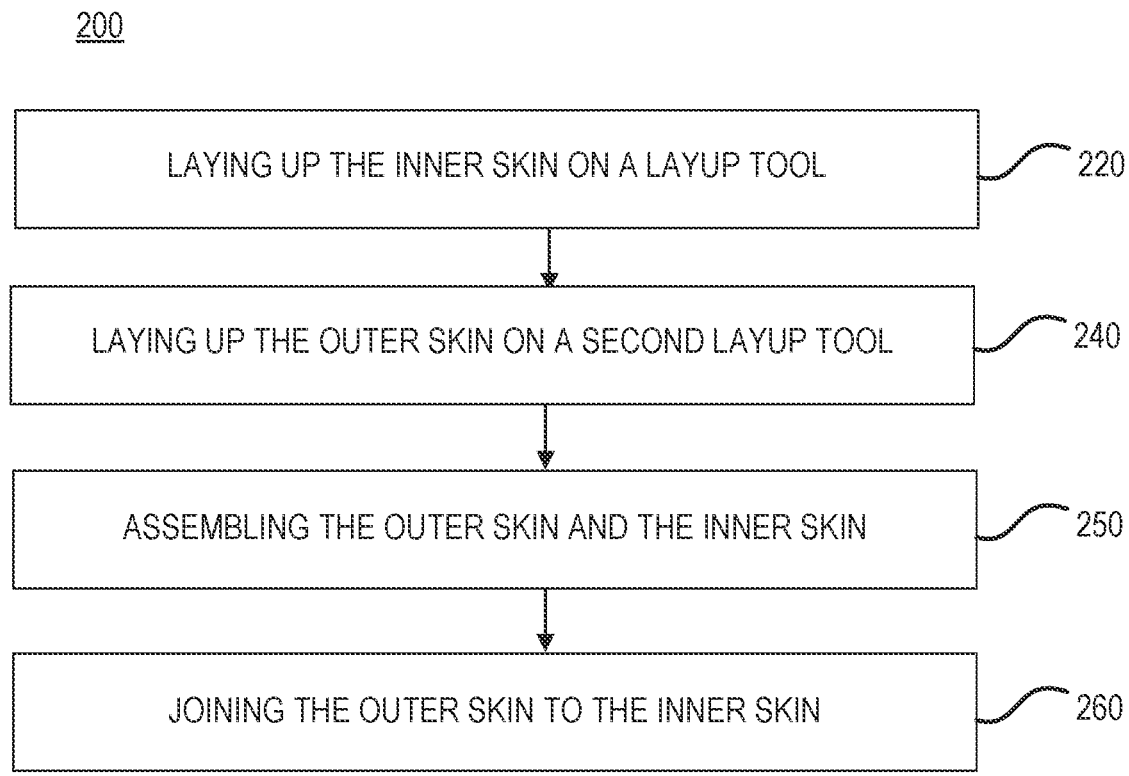
FIG. 2 provides a flow chart for a method for manufacturing a fiber-reinforced thermoplastic panel, in accordance with various embodiments.

With reference to FIG. 2, a method 200 for manufacturing a thermoplastic panel is provided, in accordance with various embodiments. Method 200 includes laying up the inner skin preform on a layup tool (step 220). The layup tool may be a hard female layup tool as opposed to a mandrel or the like. The layup tool may include a stiffener shape having peaks and valleys as described further herein. In this regard, the stiffener for the thermoplastic panel (i.e., the inner skin preform) may comprise a continuous stiffener for the thermoplastic panel. In various embodiments, step 220 may include laying up the inner skin preform by hand, an advanced fiber placement process, or the like. The present disclosure is not limited in this regard.

The method 200 further includes laying up the outer skin preform on a second layup tool (step 240). The second layup tool may correspond to a shape of the inner panel 100 from FIG. 1A. In this regard, the outer skin preform may define the outer skin preform 110 from FIG. 1A. The method 200 further includes assembling the outer skin preform and the inner skin preform (step 250) and joining the inner skin preform to the outer skin preform (step 260). In various embodiments, the joining of step 260 may be performed by placing the assembly of the inner skin preform and outer skin preform into a heated tool (i.e., a heated tool, heated oven) or welding apparatus. In various embodiments, in a heated tool, a pressure may be added to the outer skin preform and the inner skin preform in joining locations. Thus, consolidation between the outer skin preform and the inner skin preform may occur due to the pressure and cooling from the heated state, in accordance with various embodiments.

Figure 3:
FIG. 3 and FIG. 4A illustrate various steps of the manufacturing process of FIG. 2, in accordance with various embodiments.

With combined reference to FIG. 3, the method may further comprise stacking plies of fiber sheets 301 and thermoplastic resin sheets 302 to a desired thickness to form a skin preform (e.g., inner skin preform 310 and outer skin preform 410), prior to laying up in accordance with steps 220 and 240. In various embodiments, and for ease of handling, the sheets may be stacked on a substantially planar surface 305 and layed up after stacking in the layup tool. In various embodiments, the sheets may be stacked on a layup tool 320 directly.

In various embodiments, the resin sheets 302 may be "tacked." Various methods may be used to tack together the stack of sheets to hold the sheets in place with respect to each other without departing from the scope of the present disclosure, such as clamping and ultrasonic welding, among others. Furthermore, at least one resin sheet 302 between each adjacent pair of fiber sheets 301 and alternating between resin sheets 302 and fiber sheets 301 may be used depending on the desired thickness of the fiber-reinforced thermoplastic panel (i.e., the outer skin preform) or stiffening structure (i.e., the inner skin preform). Furthermore, the thickness of the panel and stiffening structure may vary. In this regard, a first location of the panel may have a first number of plies and a second location of the panel may have a second number of plies, different from the first number of plies.

Figure 4A:
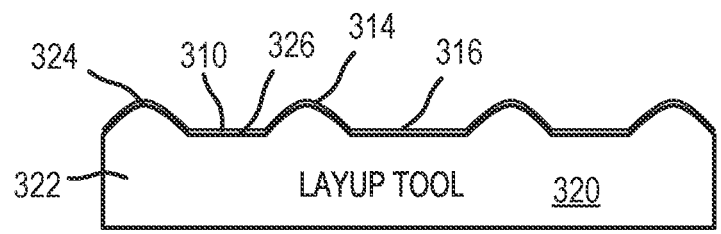

With combined reference to FIG. 2 and FIG. 4A, step 220 may include laying up the inner skin preform 310 on a layup tool 320 with equipment such as an automated fiber placement machine. In various embodiments, laying up the inner skin preform may be performed manually or automatically via a controller. The present disclosure is not limited in this regard. The layup tool 320 may comprise a hard female layup tool with a contour corresponding to a stiffening structure for the stiffened panel half 100 from FIG. 1A. In various embodiments, the layup tool 320 may facilitate a continuous inner skin preform 310 corresponding to a stiffening structure of the stiffened panel half 100 from FIG. 1A.

In various embodiments, the layup tool 320 comprises a female mold 322 including alternating peaks 324 and valleys 326. The peaks 324 may be of any appropriate profile, but are at least generally convex relative to the adjacent valleys 326 and/or protrude relative to the adjacent valleys 324. In this regard, the inner skin preform 310 may be pre-formed in the shape of the female mold 322 (i.e., inner skin preform 310 may comprise a sheets 301, 302 of FIG. 3 formed continuously as alternating peaks 314 and valleys 316) to form a stiffening structure of the stiffened panel half 100. In various embodiments, the valleys 316 may be configured to be bonded to the outer skin preform 410 in accordance with step 260 of FIG. 2 as described further herein.

Figure 4B:
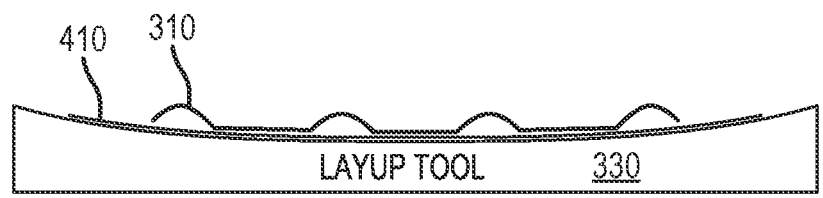
FIG. 4B illustrates various steps of the manufacturing process of FIG. 2, in accordance with various embodiments.

With combined reference to FIGS. 2 and 4B, step 240 may include laying up the outer skin preform 410 on a second layup tool 330. The second layup tool 330 may correspond to a shape of an outer surface of the stiffened panel half 100 from FIG. 1A. In various embodiments, the inner skin preform 310 may be assembled with the outer skin preform 410 on the second layup tool 330 in accordance with step 250 of method 200 (the valleys 326 of the inner skin preform 310 being disposed on or in closely-spaced relation to the inner surface of the outer skin preform 410, and with the peaks 324 of the inner skin preform 310 projecting or protruding away from the inner surface of the outer skin preform 410). In various embodiments, by fabricating the inner skin preform 310 as the stiffening structure and the outer skin preform 410 via the same process and using the same materials, the two shells may be assembled and consolidated (i.e., joined) in a significantly more efficient manner relative to typical stiffening structures for composite panels, in accordance with various embodiments.

Figure 4C:
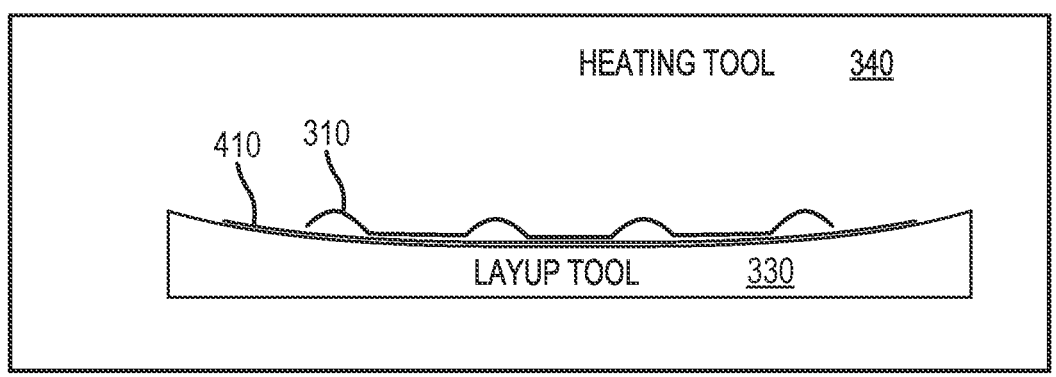
FIG. 4C illustrates various steps of the manufacturing process of FIG. 2, in accordance with various embodiments.

With combined reference to FIGS. 2 and 4C, step 260 may further include disposing the assembly of the outer skin preform 410 and inner skin preform 310 from step 250 into a heating tool 340. The heating tool 340 may be a heated oven or an autoclave. The heating tool 340 may be configured to heat and pressurize the locations being joined (i.e., apply localized heat to locations coinciding with the valleys 316 of the inner skin preform 310). Additionally, the amorphous layers from the outer skin preform 410 and the inner skin preform 310 may be utilized as bonding layers. In this regard, consolidation of the outer skin preform 410 and the inner skin preform 310 may be unsupported, in accordance with various embodiments.

In various embodiments, step 260 may further include heating, via one or more heating elements in the heating tool 340, the inner skin preform 310 and the outer skin preform 410 to a bonding temperature. Heating elements in the heating tool 340 may comprise any suitable heating element including infrared heaters, resistive heating elements, or the like. Bonding locations of the inner skin preform 310 to the outer skin preform 410 may be locally heated to a sufficient bonding temperature such that the inner skin preform 310 becomes pliable for more easily joining the outer skin preform 410 to the inner skin preform 310. In various embodiments, the term "bonding temperature" as used herein may refer to a range of temperatures which is greater than the recrystallization temperature (or glass transition temperature for amorphous thermoplastic resins) of the thermoplastic resin of inner skin preform 310 and outer skin preform 410. The suitable pliable bonding temperature may vary depending on the particular thermoplastic material being used, as well as other factors, such as the thickness of the panel. In various embodiments, the bonding temperature is a temperature below the melting temperature, but not less than the recrystallization temperature (or glass transition temperature for amorphous thermoplastic resins) of the thermoplastic. In various embodiments, the bonding temperature is a temperature above the melting temperature of the thermoplastic.

Figure 5:
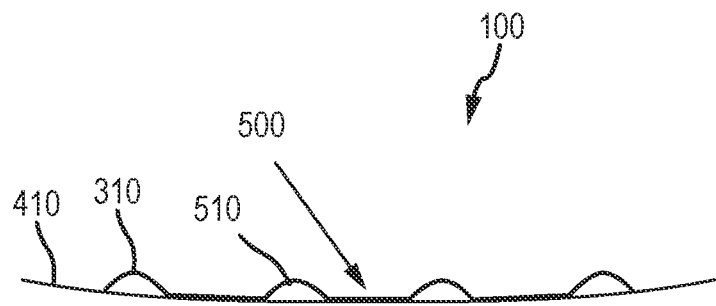
FIG. 5 illustrates a cross-sectional view of a panel half, in accordance with various embodiments.

In various embodiments, step 260 may include cooling the outer skin preform 410 and the inner skin preform 310 after consolidating and conforming the inner skin preform 310 to the outer skin preform 410 at the mating interfaces between the inner skin preform 310 and the outer skin preform 410 to a temperature below a recrystallization temperature of the thermoplastic resin (e.g., room temperature) to form the hardened skin 500 (as shown in FIG. 5). In various embodiments, the hardened skin 500 is a monolithic component (i.e., formed of a single piece) including the outer skin preform 410 of the stiffened panel half 110 from FIG. 1A and a stiffening structure 510 defined by the inner skin preform 310 being formed as the single piece via method 200 from FIG. 2.

Figure 6:
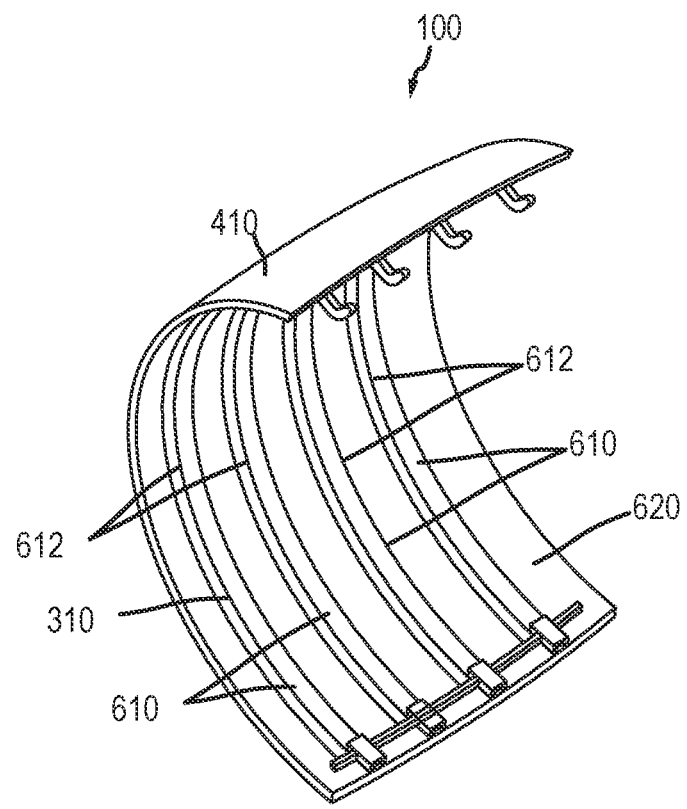
FIG. 6 illustrates a perspective view of a panel half, in accordance with various embodiments.

Referring now to FIG. 6, a perspective view of the stiffened panel half 110 from FIG. 1A is illustrated, in accordance with various embodiments. The stiffened panel half 110 may be a fan cowl for a nacelle of a gas turbine engine. The stiffened panel half 110 is formed in accordance with method 200. Thus, the stiffened panel half 110 includes the outer skin preform 410 and the inner skin preform 310 formed as a monolithic component (i.e., formed as a single piece). In various embodiments, the stiffened panel half 110 may be lighter relative to typical stiffened panel halves. In various embodiments, the stiffened panel half 110 includes a stiffening structure 610 including a plurality of peaks 612 extending radially inward from an inner surface 620, each peak in the plurality of peaks 612 including an apex spaced apart and defining a gap from the inner surface 620. In various embodiments, the inner surface 620 and the stiffening structure 610 are defined by the inner skin preform 310.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A method for forming a thermoplastic panel, comprising:
    laying up a first plurality of plies of material comprising thermoplastic resin and fiber on a first layup tool to form an inner skin preform, the inner skin preform being a continuous sheet including alternating peaks and valleys;
    laying up a second plurality of plies of material comprising thermoplastic resin and fiber on a second layup tool to form an outer skin preform, the outer skin preform including an arcuate shape, an outer surface being contoured in a longitudinal direction;
    after the laying up the first plurality of plies of material and the second plurality of plies of material, assembling the inner skin preform with the outer skin preform to form an assembled preform, the assembled preform disposed on the second layup tool with the valleys disposed on an inner surface of the outer skin preform and each peak in the alternating peaks and valleys protruding away from the inner surface of the outer skin preform, each peak and the inner surface defining a gap therebetween;
    disposing the assembled preform in an autoclave; and
    joining, by heating and pressurizing via the autoclave, the valleys of the inner skin preform to the outer skin preform to form a stiffening structure for the thermoplastic panel, wherein the valleys of the inner skin preform conform to the arcuate shape of the outer skin preform.

2. The method of claim 1, wherein joining the inner skin preform to the outer skin preform includes heating the inner skin preform and the outer skin preform to a fusing temperature.

3. The method of claim 1, wherein the joining further comprises cooling the inner skin preform and the outer skin preform to consolidate the valleys of the inner skin preform with the outer skin preform together via the joining.

4. The method of claim 1, wherein the inner skin preform and the outer skin preform are joined together through welding.

5. The method of claim 1, wherein bonding the inner skin preform to the outer skin preform forms the stiffening structure that is monolithic with the thermoplastic panel.

6. The method of claim 1, wherein the first layup tool comprises a hard female layup tool, and wherein the first plurality of plies of material are layed up in the hard female layup tool including a second set of alternating peaks and valleys, the second set of alternating peaks and valleys in accordance with the alternating peaks and valleys of the continuous sheet.

7. The method of claim 6, wherein the second layup tool has a second female mold corresponding to the outer surface of the thermoplastic panel, and wherein the inner skin preform and the outer skin preform are assembled prior to joining without the first layup tool.

8. The method of claim 7, wherein the assembling further comprises transferring the inner skin preform from the first layup tool onto the outer skin preform in the second layup tool.

9. The method of claim 1, wherein the joining further comprises applying localized heat and pressure to joining locations coinciding with an interface between the valleys of the inner skin preform and the outer skin preform.

10. The method of claim 9, wherein the joining further comprises cooling the inner skin preform and the outer skin preform to a temperature below a recrystallization temperature of the thermoplastic resin to form the thermoplastic panel.

11. The method of claim 10, wherein each peak in the alternating peaks and valleys includes an apex spaced apart and defining the gap from the inner surface.

12. The method of claim 1, wherein the laying up the first plurality of plies of material and the laying the second plurality of plies of material are each performed via an automated fiber placement machine.

13. A method of manufacturing a thermoplastic panel, the method comprising:
    assembling an inner skin preform and an outer skin preform to form an assembled preform, the inner skin preform having a first contour including alternating peaks and valleys prior to the assembling, the valleys of the inner skin preform in contact with an inner surface of the outer skin preform, the outer skin preform including an arcuate shape, an outer surface of the outer skin preform being contoured in a longitudinal direction, each peak and the inner surface defining a gap therebetween;
    disposing the assembled preform in an autoclave;
    applying localized heat and pressure, via the autoclave, to joining locations coinciding with an interface between the valleys of the inner skin preform and the outer skin preform; and
    consolidating the valleys of the inner skin preform to the outer skin preform to form the thermoplastic panel, the thermoplastic panel including a stiffening structure formed from the inner skin preform, wherein the valleys of the inner skin preform conform to the arcuate shape of the outer skin preform.

14. The method of claim 13, wherein the alternating peaks and valleys are defined in the longitudinal direction.

15. The method of claim 13, wherein the inner skin preform is continuous.

16. The method of claim 13, wherein each peak in the alternating peaks and valleys extends circumferentially along the inner surface of the outer skin preform.

17. The method of claim 13, wherein the valleys in the alternating peaks and valleys are joined to the inner surface of the outer skin preform in response to the heating.

18. The method of claim 13, wherein the inner skin preform and the outer skin preform both comprise a plurality of plies of material comprising thermoplastic resin and fiber.

19. The method of claim 13, wherein a third material is placed between the inner skin preform and the outer skin preform.

20. The method of claim 13, further comprising laying up a first plurality of plies of material to form the inner skin preform and laying up a second plurality of plies of material to form the outer skin preform prior to assembly.

* * * * *